United States Patent
Balduin et al.

(10) Patent No.: US 9,771,297 B2
(45) Date of Patent: *Sep. 26, 2017

(54) METHOD FOR CAMBERING GLASS SHEETS BY SUCTION

(71) Applicant: Saint-Gobain Glass France, Courbevoie (FR)

(72) Inventors: Michael Balduin, Alsdorf (DE); Michael Labrot, Aachen (DE); Karl-Josef Ollfisch, Roetgen (DE); Herbert Radermacher, Raeren (BE); Guenther Schall, Kreuzau (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 614 days.

This patent is subject to a terminal disclaimer.

(21) Appl. No.: 14/266,346

(22) Filed: Apr. 30, 2014

(65) Prior Publication Data

US 2014/0230493 A1    Aug. 21, 2014

Related U.S. Application Data

(62) Division of application No. 13/293,786, filed on Nov. 10, 2011, now Pat. No. 8,746,011, which is a division (Continued)

(30) Foreign Application Priority Data

Dec. 31, 2004    (FR) ..................... 04 53290

(51) Int. Cl.
*C03B 23/03*    (2006.01)
*C03B 23/035*    (2006.01)
*C03B 35/14*    (2006.01)

(52) U.S. Cl.
CPC .......... *C03B 23/0302* (2013.01); *C03B 23/03* (2013.01); *C03B 23/035* (2013.01);

(Continued)

(58) Field of Classification Search
CPC ... C03B 23/0302; C03B 23/03; C03B 23/035; C03B 23/0357; C03B 23/145; C03B 35/145; Y02P 40/57

(Continued)

(56) References Cited

U.S. PATENT DOCUMENTS 3,778,244 A    12/1973    Nedelec et al.
4,859,225 A    8/1989    Kuster et al.

(Continued)

FOREIGN PATENT DOCUMENTS

DE    103 14 267    8/2004
EP    0 363 097    4/1990

(Continued)

OTHER PUBLICATIONS

Office Action issued Sep. 25, 2012 in Korean Patent Application No. 10-2007-7014676.

*Primary Examiner* — Michael H Wilson
*Assistant Examiner* — Yana B Krinker
(74) *Attorney, Agent, or Firm* — Oblon, McClelland, Maier & Neustadt, L.L.P.

(57) ABSTRACT

A method and device for bending superposed sheets of glass. The sheets are picked up by a top form furnished with a suction creating an upward airflow blowing over the rim of the sheets, the suction being sufficient to lift and hold the superposed sheets against the top form, then the sheets are pressed between the top form and a full surface solid concave bottom form furnished with openings, the pressing beginning conducted while the suction is not yet finished or is finishing, then the superposed sheets are formed, by suction of the main face of the bottom sheet through the openings of the bottom concave mold, the forming by suction beginning while the pressing is not yet finished, and then the sheets are cooled. Windshields free of optical defects may thus be produced.

17 Claims, 6 Drawing Sheets

Related U.S. Application Data of application No. 11/813,145, filed as application No. PCT/FR2005/051093 on Dec. 15, 2005, now Pat. No. 8,109,117.

(52) U.S. Cl.
CPC ........ *C03B 23/0357* (2013.01); *C03B 35/145* (2013.01); *Y02P 40/57* (2015.11)

(58) Field of Classification Search
USPC .................................................. 65/106, 287
See application file for complete search history.

(56) References Cited

U.S. PATENT DOCUMENTS

| | | | |
|---|---|---|---|
| 5,006,146 A | 4/1991 | Mathivat et al. | |
| 5,352,263 A * | 10/1994 | Kuster | C03B 23/035 65/104 |
| 5,651,805 A | 7/1997 | Kuster et al. | |
| 5,713,976 A | 2/1998 | Kuster et al. | |
| 7,302,813 B2 | 12/2007 | Balduin et al. | |
| 2004/0016263 A1 | 1/2004 | Moulding et al. | |
| 2004/0107729 A1 | 6/2004 | Fukami et al. | |
| 2004/0129028 A1* | 7/2004 | Balduin | C03B 23/0252 65/106 |
| 2006/0162385 A1 | 7/2006 | Yamanaka et al. | |
| 2007/0157671 A1* | 7/2007 | Thellier | C03B 23/0252 65/106 |

FOREIGN PATENT DOCUMENTS

| | | |
|---|---|---|
| EP | 0 531 152 A2 | 3/1993 |
| EP | 0 872 456 | 10/1998 |
| FR | 2 852 951 | 10/2004 |
| JP | 52-43855 | 11/1977 |
| JP | 2002226225 | 8/2002 |
| KR | 10-1343631 | 12/2013 |
| WO | 02 064519 | 8/2002 |
| WO | WO 2004/087590 A2 | 10/2004 |

* cited by examiner

METHOD FOR CAMBERING GLASS SHEETS BY SUCTION

CROSS-REFERENCE TO RELATED APPLICATIONS

This application is a divisional of U.S. application Ser. No. 13/293,786, filed Nov. 10, 2011, which is a divisional of U.S. application Ser. No. 11/813,145, filed Jun. 29, 2007, the entire contents of which are incorporated herein by reference. U.S. application Ser. No. 11/813,145 is a National Stage of PCT/FR05/51093, filed Dec. 15, 2005, and claims the benefit of priority to French Application No. 0453290, filed Dec. 31, 2004.

BACKGROUND

Field

The invention relates to a method of bending glazing units by which the glass is sucked by openings passing through a solid concave mold to take the form of said concave mold. The method according to the invention is more particularly suited to a rapid industrial production process, leading to glazing units free of optical defects.

The invention relates most particularly to the simultaneous bending of superposed sheets of glass (usually two superposed sheets of glass) that are required to be assembled later into a laminated glazing unit, particularly of the type of sheets intended to serve as windshields of motor vehicles. The sheets are assembled in a manner known to those skilled in the art by inserting between the sheets of glass a layer of polymer, usually of the polyvinylbutyral type.

Description of the Related Art

EP0363097 teaches the suction of a single sheet through a bottom concave mold. After bending, the sheet is separated from the bottom mold by a frame surrounding the concave form and rising to carry the sheet with it. To be able to carry the sheet upward, the latter must protrude beyond all the edges of the concave mold. Such a protrusion is not satisfactory for bending the edges, which are not always precisely formed during the bending. The result of this is a risk of bending defects at the edges of the sheet. Furthermore, this document gives no information relating to the bending of several superposed sheets.

U.S. Pat. No. 3,778,244 teaches a top form fitted with a suction skirt placed above a bottom mold furnished with suction orifices through its solid full surface. These two bending forms work one after the other without carrying out any pressing of the glass, since, when a sheet has been partially bent against the top form, this sheet is allowed simply to fall on the bottom form (col 5 lines 3-6).

WO02064519 teaches the bending of superposed sheets through a bottom concave mold. A top oddside mold may squeeze the edges of the two sheets together at the time of suction by the concave form. Here also, it is a frame surrounding the bottom form which, when rising, picks up the sheets after bending. Consequently, the sheets must also protrude from the bottom form. Furthermore, even though this method represents notable progress, the desire is to be able to accelerate it in the context of an industrial usage. To be able to accelerate it, it is possible to work on the value of the vacuum used during the suction. The applicant has however observed that it was appropriate not to push the vacuum beyond a vacuum pressure of approximately 100 mbar (the difference between atmospheric pressure and the pressure in the bottom mold), because that could lead to optical defects visible to the naked eye, of the distorted vision type. It seems that this defect originates in fact from a clearance being created between the various sheets during the suction. This clearance may even reach 1 mm in the central region. The optical distortions that result therefrom may reach 90 mdpt (millidioptres).

SUMMARY

The invention resolves the aforementioned problems. According to the invention, upward suction means are used, particularly of the suction skirt type, to pick up the sheets of glass, before the suction bending step. It has been discovered that the use of this type of means of support procured a double advantage: 1) on the one hand, it is no longer necessary for the sheets to protrude beyond the bottom concave mold, 2) on the other hand, and unexpectedly, if the suction/holding step (upward suction) is correctly combined with the suction/bending step (downward suction) through the bottom mold, it is possible to push the vacuum in the bottom concave mold beyond a vacuum pressure of 100 mbar without, for all that, causing optical defect problems. As a result, the invention allows superposed sheets to be bent at very rapid production rates.

Without this explanation causing a limitation to the scope of the present invention, it seems that the upward suction removes a substantial portion of the air between the superposed sheets and contributes to a better combination of the superposed sheets. The consequence of this is that the sheets are all more accurately brought toward the concave bottom form during the suction/bending step on the bottom mold. Specifically, it seems that the presence of residual air between the sheets could prevent a sheet that is not in direct contact with the bottom mold from following the bottom sheet during the suction bending step.

Thus, the invention relates in particular to a method of forming superposed sheets of glass (usually two superposed sheets of glass) brought to their forming temperature, comprising:

a suction/holding step comprising the sheets being picked up by a top form furnished with suction means creating an upward airflow blowing over the rim (edge) of the sheets, said suction being sufficient to lift and hold the superposed sheets against said top form, then a pressing step comprising the pressing of the sheets between the top form and a full surface solid concave bottom form furnished with openings (holes), said pressing beginning while the suction of the preceding step is not yet finished or is finishing, then a suction/bending step comprising the forming of the superposed sheets, by suction of the main face of the bottom sheet through the openings of the bottom concave mold, said suction forming beginning while the pressing of the preceding step is not yet finished, then a cooling step comprising the cooling of the sheets.

According to the invention, it has been discovered that the suction exerted during the suction/holding step serves not only to hold the sheets in order to place them in the appropriate position above the bottom bending mold, but it also draws the air from between the sheets. That is why it is preferred according to the invention to begin the pressing step while the upward suction is still operating or is in the process of finishing, because the pressing step procures an intimate contact between the sheets and ensures the seal between them, at a time when the air has been drawn from between the sheets. In practice, the upward suction may be stopped as soon as the pressing step begins, so that stopping the upward suction may be virtually simultaneous with beginning the pressing step. Specifically, no elastic effect intervenes to separate the sheets. This pressing step therefore prevents air from returning between the sheets. The sheets are then ready to be bent by suction of the bottom sheet. This (downward) suction by the bottom mold begins although the pressing step is not yet finished. The absence of air between the sheets means that all the sheets correctly follow the bottom sheet while it is being formed. It was noted that it was possible to exert a vacuum pressure of 350 mbar at the suction/bending step which resulted in a maximum clearance between the sheets of 0.5 mm, and an optical distortion of less than 70 mdpt, these values being capable of varying depending on the geometry and the complexity of the bending forms sought. It is not necessary to continue the pressing throughout the bending by suction. Specifically, once the bending by suction has begun and once the viscoelastic stresses are relaxed, the pressing can be released because the superposed sheets remain well pressed together. Preferably, the suction of the suction/bending step is therefore executed for a sufficient period for the required shape to be obtained and for the viscoelastic stresses after obtaining this final shape to be relaxed.

The top form picking up the sheets may be a full surface solid form or preferably a frame. "Frame" means a strip of an appropriate material (usually metal) offering at the periphery of the sheet placed in the top position a contact surface usually from 0.5 mm to 10 cm wide. "Periphery" means the border zone, of annular shape, of a main face of the sheet situated at less than 15 cm from all the edges.

The pressure exerted during the pressing step may be very light. Specifically, it is usually sufficient to push the top sheet a little (while the upward suction is still being exerted or is in the process of stopping) so that the two sheets are more intimately juxtaposed. Preferably, this pressure is exerted in the peripheral zone of the sheets. Preferably, the pressure is exerted so as to prevent air passing between the sheets.

The bottom bending mold is concave and its concavity corresponds substantially to the desired final shape of the glazing unit. This bottom mold is solid and comprises, at its surface, openings allowing the suction of the sheet that is placed in the bottom position and with which it is in contact. This bottom mold is preferably at least as large as the bottom sheet, so that the superposed sheets do not protrude beyond the mold at any location.

Once the suction through the bottom mold has begun, it is possible to stop the pressure by separating the top form and the bottom mold from one another. At this moment, there is no more upward suction. The downward suction through the bottom mold usually lasts from 1 s to 40 s.

The suction forces exerted on the sheets on the one hand during the suction/holding step (upward) and on the other hand during the suction/bending step (downward) are therefore different. Specifically, the first case involves creating a vacuum pressure at the border of the sheets so as to lift the sheets upward and also suck the air out from between the sheets (high airflow, for example of the order of 25 000 $m^3$ of air per hour for a 1.8 $m^2$ windshield), and the second case involves pressing the sheet in the bottom position against the bottom mold (large vacuum pressure and low airflow). The upward suction therefore requires the creation of a strong airflow blowing over the rim of the sheets, whereas the downward suction (for bending) requires the air to be drawn off through openings distributed substantially over the whole surface of the bottom mold. Usually, the upward suction of the suction/holding step is generated through a skirt surrounding the top form. To be better able to pick up and raise the sheets, the skirt surrounding the top form may come into contact with the support on which the sheets rest. If this support is a frame, its central part allows the air to pass beneath the sheets of glass which are then lifted without difficulty. If the support is not a frame, at least one orifice can be provided in the support beneath the sheets so that the air sucked through the skirt more easily raises the sheets.

To be picked up at the suction/holding step, the superposed sheets may be flat or already pre-bent before said step and have a temperature allowing them to be bent (usually between 560 and 610° C.). They are preferably pre-bent. Usually, this pre-bending has been carried out by gravity collapsing on a pre-bending support, usually of the frame or skeleton type. When the bends to be applied during the pre-bending step are relatively major, an articulated skeleton or any type of skeleton subjecting the sheets to several shapes successively may be used. In particular, these may be the skeletons described in EP 448447, EP 705798 or application PCT/FR2004/050198. Any pre-bending step gives the sheets the shape of a rough, part way between the flat shape and the desired final shape. This pre-bending may also give the periphery of the glazing unit its final shape, whereas the central part is only roughed. The existence of a pre-bending step is preferred when the final shape has relatively accentuated curves, particularly when the final shape has curves in directions orthogonal to one another (double bending). Motor vehicle manufacturers are increasingly making use of this type of complex shape having considerable double bending. This pre-bending is usually achieved by gravity, the superposed sheets being placed on an appropriate support which travels through a tunnel oven toward the main bending zone comprising the top form and the bottom bending mold. The tunnel oven is used both for giving the sheets the bending temperature and for carrying out the pre-bending. The pre-bending supports travel through the tunnel oven for example by being mounted on wheeled trolleys placed on rails. The pre-bending supports pass beneath the top form, which then picks up the superposed sheets thanks to the upward suction as already explained.

As already mentioned, the pre-bending support, particularly of the skeleton type, may offer, as a surface of contact with the glass, a shape that changes as it moves. This change may take place during the movement toward the position beneath the top form, while the support carries the superposed sheets. In particular, the contact surface of the pre-bending support may take at the periphery the final shape desired for the glass, even before being picked up by the top form. This does not mean that the glass already takes the desired final shape before being picked up by the top form, because the collapsing of the glass at the periphery may not be finished at that time and furthermore, even if the periphery of the glass touches the pre-bending support everywhere, the central zone has not, at any rate, taken the final desired shape. If the pre-bending support has the desired final peripheral shape for the sheets when picked up by the top form, this support may also pick up the sheets after the final bending in order to take them to the cooling zone without it being necessary to change its shape again. It is also possible for the pre-bending support to keep a rough peripheral shape until picked up by the top form, then, when it is no longer supporting the sheets, take the final peripheral shape desired for the sheets. Specifically, if this support must pick up the sheets after the final molding by the bottom mold, in order to take the sheets to the cooling zone, it is preferable for this support to have a shape that corresponds well to the final shape desired for the sheets.

Before any heating of the sheets, it is possible to place between the sheets superposed in an assembly a powder preventing the various sheets from sticking together during the bending process. This powder (possibly being silica for example) is placed in a manner known to those skilled in the art.

The contact surface of the top form may correspond to that of the top sheet when it is ready to be picked up, that is to say it may be flat if the sheets arrive flat beneath it, or have a rough shape corresponding to that given to the sheets by any pre-bending process, or have, at least at the periphery, the desired final shape. Preferably, the top form has at the periphery the desired final shape. In any case, the top form has no curves less accentuated than those of the sheets that it must pick up.

When the bending is finished and the sheets are resting on the bottom bending mold, the sheets may be cooled. To do this, it is preferable to separate the sheets from the bottom mold in order to subsequently place them on a support called a cooling support. The sheets may for example be separated from the bottom mold by upward suction in a manner similar to that used during the suction/holding step. It is even possible to use the same top form to carry out the suction/holding step and the separation from the bottom mold. However it is also possible to use a second top form (which may be called FS2 in the context of the present application) furnished with the necessary suction means (particularly of the skirt type), surrounding it, to carry out this separation operation. After separation from the bottom mold by picking up with a top form, the latter then releases the sheets on top of a cooling support which carries the sheets toward the appropriate cooling zone. When a second top form is used, the latter advantageously has a contact shape with the top sheet corresponding to the final shape of the glazing unit. In all cases, the cooling support advantageously has a contact shape facing the sheet placed in the bottom position corresponding to the final shape of the glazing unit. Usually the cooling process is close to natural cooling, of the type used on the sheets intended to incorporate a laminated glazing unit for a motor vehicle windshield.

Thus, according to the invention, the bent superposed sheets may be separated from the bottom concave mold after the suction/bending step, by being picked up with the aid of a top form furnished with suction means creating an upward airflow blowing over the rim of the sheets, said suction being sufficient to lift and hold the superposed sheets against said top form, said top form then letting the bent superposed sheets rest on a support taking them toward a cooling zone for the completion of the cooling step.

In particular, the top form separating the bent sheets from the bottom mold may be a second form (FS2) distinct (but possibly having the same shape) from the first top form (FS1) picking up the sheets at the suction/holding step, the sheets possibly being moved from a position beneath the form FS1 to a position beneath the form FS2 by the movement of the bottom mold supporting them.

The use of two top forms makes it possible to accelerate the rates of the process relative to the variant with a single top form. Specifically, when the second form (FS2) lets a set of bent superposed sheets rest on a support that is to take it to a cooling zone for the completion of the cooling step, the bending of another set of superposed sheets may already begin, the bottom concave mold being placed beneath the first form (FS1).

The support taking a set of superposed sheets to the bending unit may be the same support that collects the sheets after bending to take them to the cooling zone.

Usually, the top form and the bottom bending mold are placed in a bending unit taken to the bending temperature.

The superposed sheets in one and the same assembly (or package) have substantially the same shape. Their size may vary slightly in the direction of a diminution of their surface area when moving from the sheet placed in a bottom position to that placed in a top position, so that the borders of the sheets coincide after the bending.

The invention also relates to a device making it possible to apply the method according to the invention. The device according to the invention is a device for bending sets of superposed sheets of glass comprising
a convex top form FS1 furnished with means of suction around it, creating an upward airflow blowing over the rim of the sheets, said suction being sufficient to lift and hold the superposed sheets against said top form, and
a bottom solid concave mold furnished with openings on its main face and means of suction through these openings,
said top form and said bottom mold having complementary shapes and being able to move toward one another along a vertical axis to press the sheets of glass.

In particular, this device may comprise a train of pre-bending supports moving to pass one after the other beneath the top convex form (FS1) so that the sets of superposed sheets may be picked up by said top form (FS1).

This device may furthermore comprise another convex top form (FS2) furnished with means of suction around it, creating an upward airflow blowing over the rim of the superposed sheets, said suction being sufficient to lift and hold the superposed sheets against it, the bottom concave mold being able to be moved to pass alternately beneath one and then the other of the top forms (FS1 and FS2).

For the case in which the device comprises two top forms, it may also comprise a train of pre-bending supports moving to pass beneath the two top convex forms.

DETAILED DESCRIPTION

Figure 1:
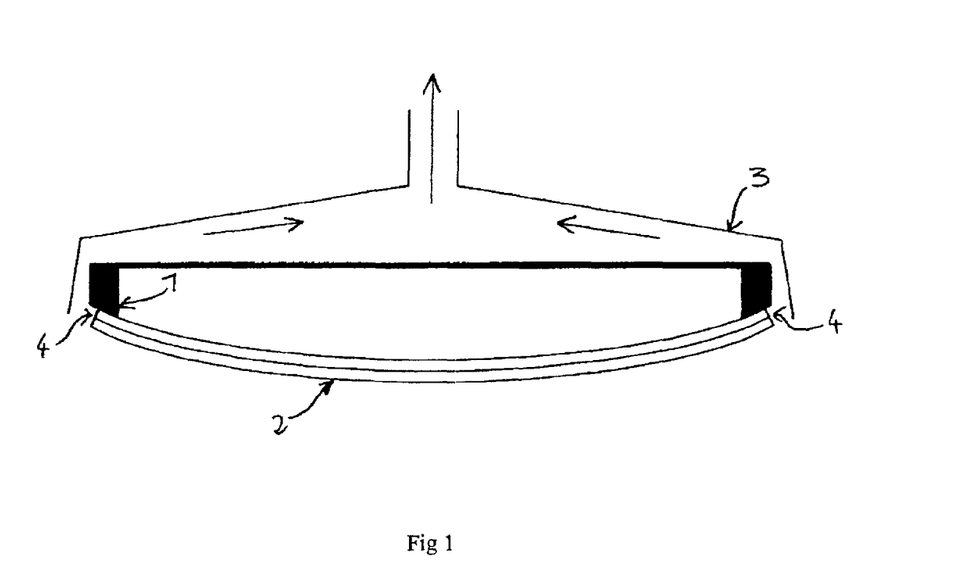
FIG. 1 is a cross-sectional view of a top form of the annular frame according to an exemplary embodiment of the present disclosure.

FIG. 1 represents a top form 1 of the annular frame type coming into contact with the periphery of the top sheet of a set 2 of two superposed sheets. A skirt 3 surrounds the form 1 and is capable of exerting a suction (in the direction of the arrows) sufficient for the two superposed sheets to be held against the top form 1. The sucked air blows over the rim 4 of the sheets. Usually, the top form is coated with a material made of refractory fibers (metal and/or ceramic fibers) of the felt, woven or knit type, softening the contact of the glass with it and reducing the risks of marking. In addition, the air can circulate inside the fibrous material in all directions which generates an additional diffusion of the airflow.

Figure 2:
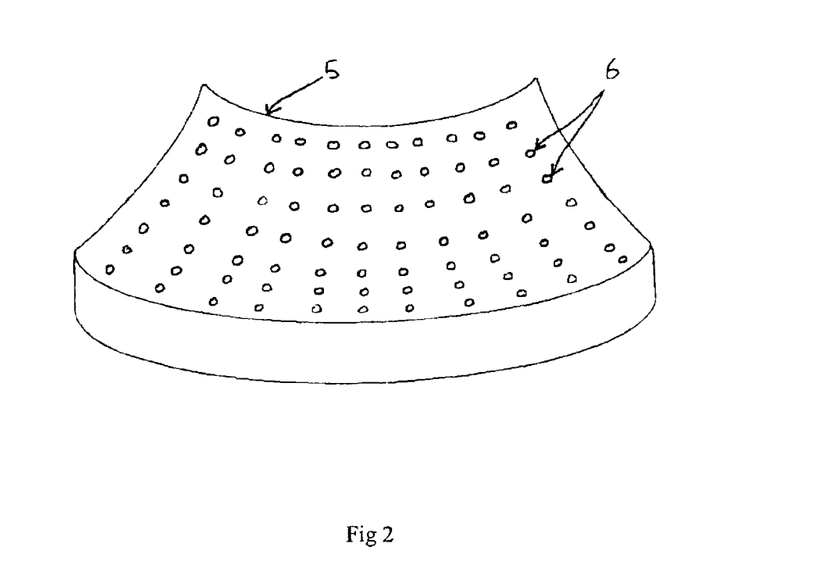
FIG. 2 is a perspective view of the bottom mold according to an exemplary embodiment of the present disclosure.
Figure 3A:
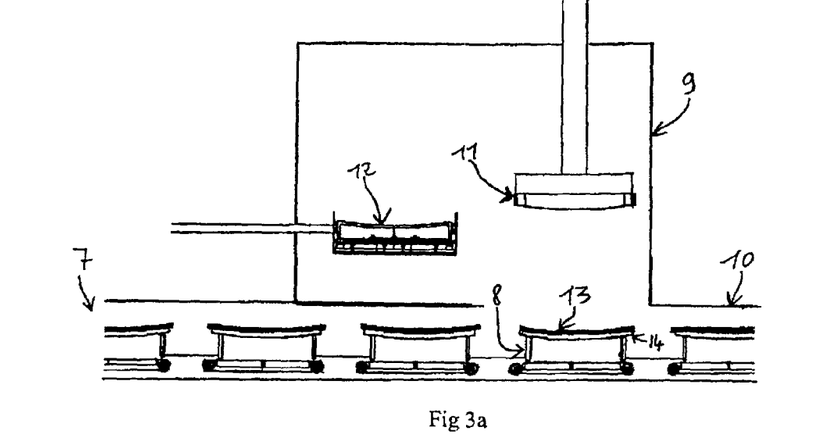
FIGS. 3a-3d represent a sequence of a method of the invention using one top form according to an exemplary embodiment of the present disclosure.
Figure 3B:
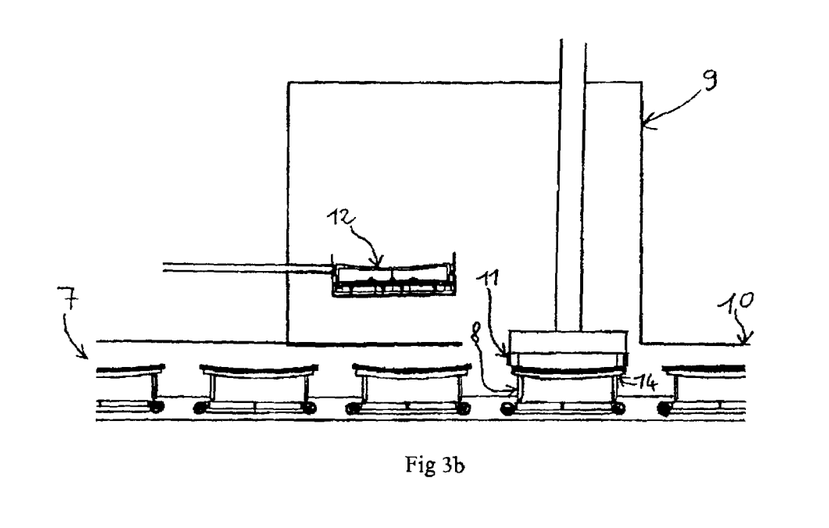
Figure 3C:
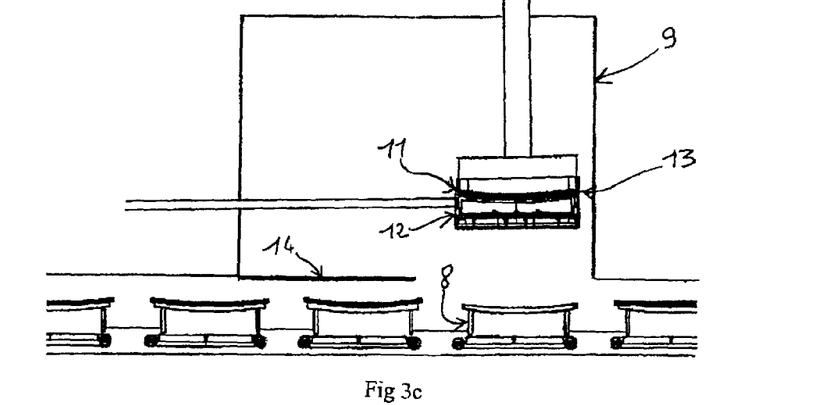
Figure 3D:
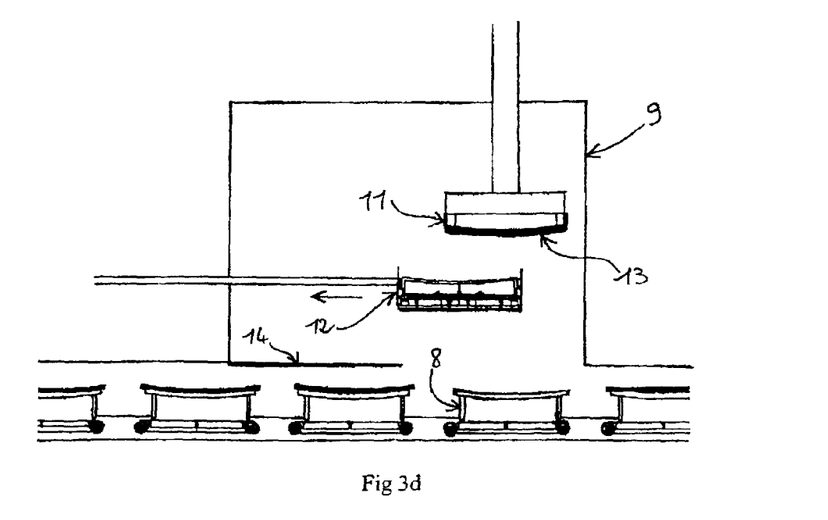
Figure 4A:
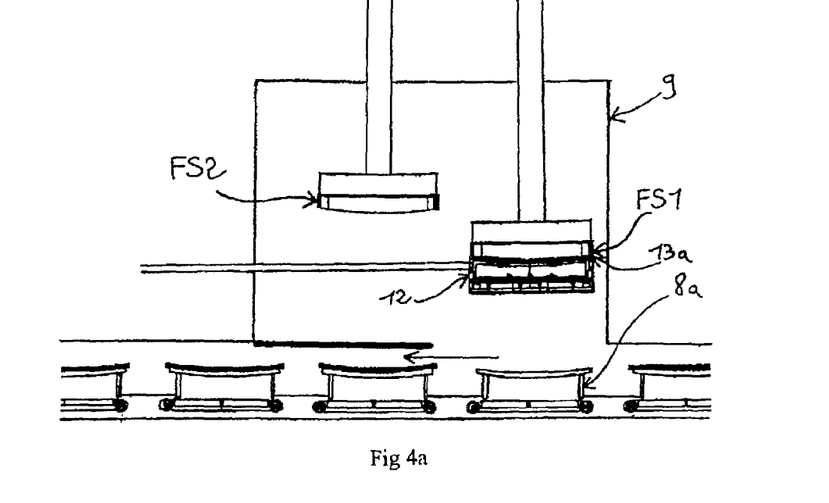
FIGS. 4a-4d represent a sequence of a method of the invention using two top forms according to an exemplary embodiment of the present disclosure.
Figure 4B:
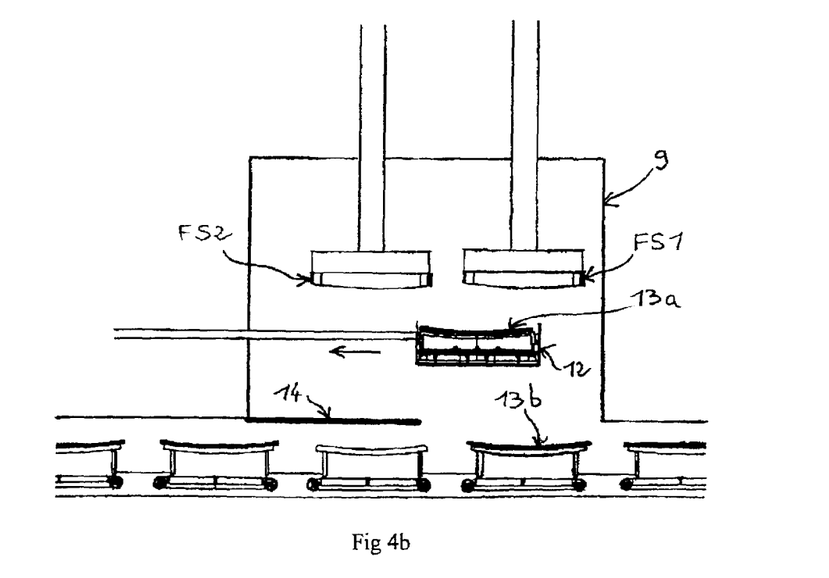
Figure 4C:
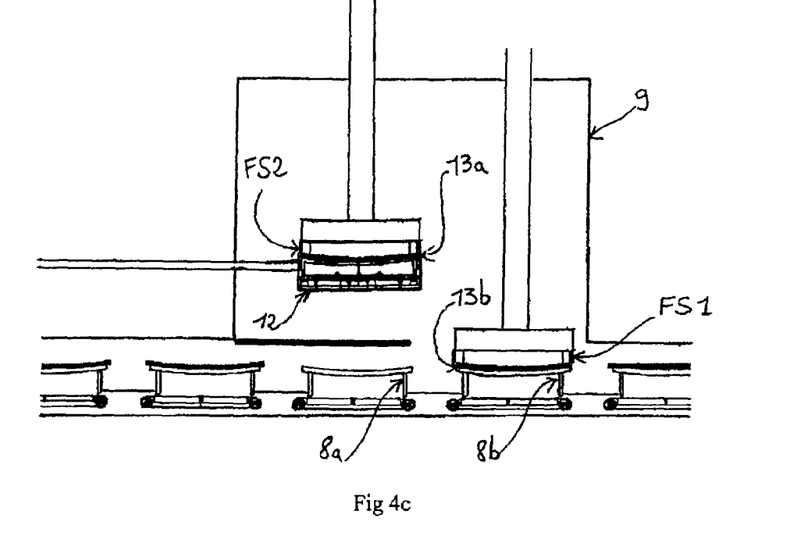
Figure 4D:
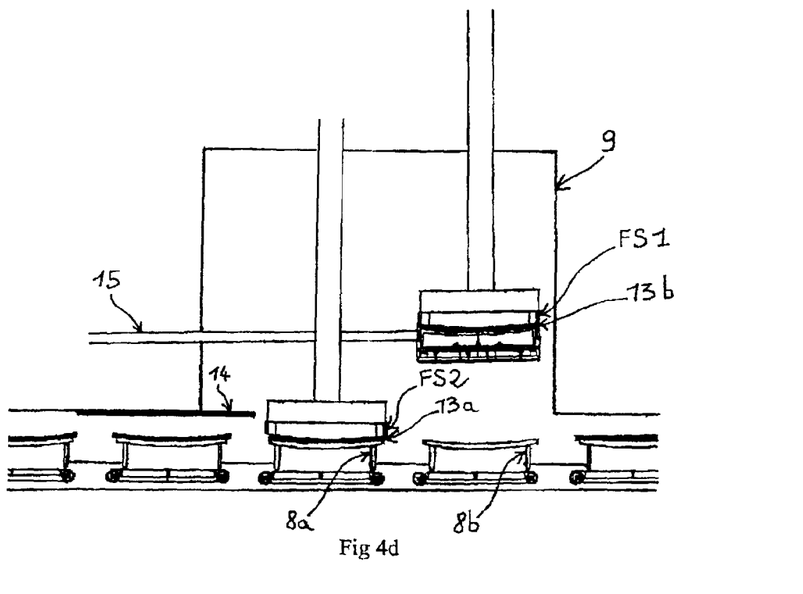

FIG. 2 represents a bottom concave mold 5 furnished on its main top face with a multitude of orifices (openings, holes) 6. A suction created through these orifices bends the superposed sheets by pressing them against the main top face of the mold. Usually, this bottom mold is coated with a material made of refractory fibers (metal and/or ceramic fibers) of the felt, woven or knit type, softening the contact of the glass with it and reducing the risks of marking. In addition, the air can circulate inside the fibrous material in all directions which generates an additional diffusion of the airflow. This mold has the final shape desired for the sheets.

FIG. 3 represents a few sequences of an embodiment of the method according to the invention when it comprises only one top suction form. A train 7 of trolleys 8 each carrying two superposed sheets of glass, takes the sheets (traveling from right to left in FIG. 3) beneath a bending unit 9 whose interior is at the bending temperature. Each trolley carries a pair of sheets 13 by means of a pre-bending skeleton 14. This skeleton may have its contact surface modified in the sense of an increase in the bends during its path toward the bending unit. On arrival beneath the unit 9, each trolley has already covered a certain distance through a tunnel oven 10 so as to cause the pre-bending of the sheets. Beneath the unit 9, the skeleton presents a surface of contact (only for the periphery of the sheets) corresponding to the desired final shape, and the sheets have taken this shape at the periphery but not in their central region. The unit 9 contains a top form 11 fitted with a skirt (on the principle of FIG. 1) that is able to move vertically, and a bottom concave mold 12 furnished with openings (on the principle of FIG. 2) capable of moving horizontally. The top form is a frame having the shape of a ring and whose shape corresponds to the final shape desired for the sheets. The bottom mold has the final shape desired for the sheets. At the time of FIG. 3a, the train stops so that a trolley is just at the vertical of the top form. The top form 11 then descends toward the trolley 8 to pick up the two superposed sheets thanks to the suction of its skirt (FIG. 3b). The top form 11 rises again with the sheets, sufficiently high for the bottom mold 12 to move just beneath it by horizontal translation. The top form then descends again slightly to lightly press the periphery of the sheets against the bottom mold (the skirt is again in operation at that time) as shown in FIG. 3c. The downward suction through the openings of the main face of the bottom mold may then begin to produce the bending by flattening against said face. This suction usually lasts from 1 s to 40 s. When the bending is finished, the top form can rise again with the sheets 13 while the bottom mold 12 resumes its rest position on the left. The top form 11 can then descend again to deliver the two bent sheets 13 to the same trolley 8 as the one that brought it. The train 7 can depart leftward so that the next pair of sheets is positioned just beneath the top form 11 and undergoes the same bending cycle as the pair preceding it. The train 7 travels therefore intermittently, constantly stopping and starting, each start corresponding to a translation by a distance of one trolley. The sheets are progressively taken leftward in the direction of a cooling zone. A fixed horizontal wall 14 placed beneath the rest position (toward the left) of the bottom mold 12 helps to thermally insulate the bending unit from the tunnel leading to the cooling zone.

FIG. 4 represents a few sequences of an embodiment of the method according to the invention when it comprises two top suction forms FS1 and FS2. The start of the method begins like the one explained for FIG. 3: the train brings the pairs of sheets pre-bent by gravity on skeletons, and stops so that one of the trolleys (trolley 8a) carrying the pair of sheets 13a stops just beneath the first top form FS1. The latter then picks up the pair of sheets 13a and rises again with it sufficiently high for the bottom concave mold 12 to be able to be placed beneath the sheets 13a. The form FS1 then descends again to cause the sheets to be pressed between FS1 and the bottom mold 12. FIG. 4a represents this moment in the method. During the pressing, then the suction exerted on the sheets 13a, the train moves leftward by a distance of one trolley so that the trolley 8a is beneath the top form FS2. After the bending begins, the form FS1 rises without lifting the sheets 13a, the latter remaining placed on the bottom mold 12 which continues the bending by suction. Specifically, even if no top form touches the sheets at this stage, the sheets remain well pressed together without separating because what is important is that a pressing action takes place at least at the very beginning of the bending suction. The bottom mold 12 is then moved leftward (FIG. 4b) to be beneath the form FS2. The form FS1 can then descend to pick up the next pair of sheets 13b. For its part, the top form FS2 descends to pick up the pair of sheets 13a (FIG. 4c). The form FS1 rises again with the pair 13b and the bottom mold 12 is then placed beneath the form FS1 to press and bend by suction the pair of sheets 13b in the same manner as has been described for the pair of sheets 13a. The partition 14 which insulated the bending unit from the tunnel leading to the cooling zone is here a movable wall that has been retracted leftward at this stage of the method so that the form FS2 carrying the pair of sheets 13a can rest this pair on the trolley 8a (FIG. 4d). Naturally, the support 15 actuating the translation of the bottom mold 12 has the necessary orifice so that the form FS2 can descend to the trolleys. Furthermore it is also possible to actuate the translation of the bottom mold 12 from the bottom of the unit, the support 15 then being perpendicular in FIG. 4d. After the pair 13a has been deposited on the support 8a, the form FS2 rises again, the movable partition 14 returns leftward beneath the form FS2 in order to insulate the bending unit. The trolley train then moves leftward by a distance of one trolley. It can be seen that this embodiment is more efficient than that of FIG. 3 because it has been possible here to move the pair 13a during its bending and begin to place in position a new pair 13b while the bending of the pair 13a was finishing. With this embodiment with two top forms FS1 and FS2, the cycle time-saving corresponds to the trolley transfer time, because it is possible to press while the trolley train is moving.

Figure 5:
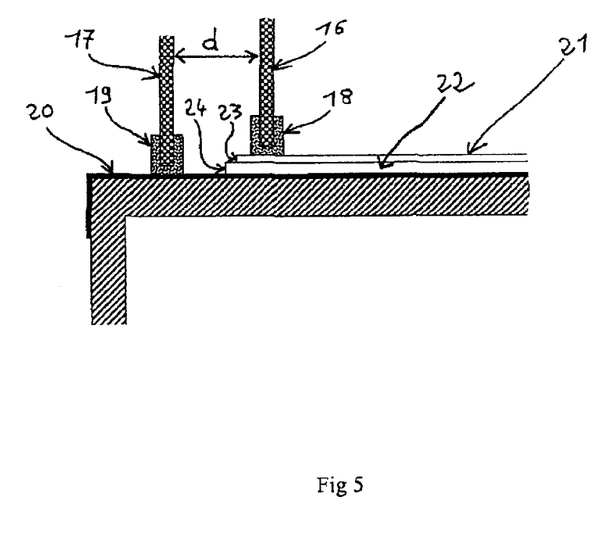
FIG. 5 depicts a part of the top form coming into contact with the glass.

FIG. 5 represents the part of a top form 16 coming into contact with the glass, said top form being fitted with a skirt 17. The top form 16 is furnished with a felt element 18 softening the contact with the glass. The skirt 17 is also furnished with a felt element 19 to soften the contact with the support 20. At the moment represented by FIG. 5, the top form will pick up two superposed sheets of glass 21 and 22 resting on the support 20. To make the sheets easier to lift, orifices (not shown) may be provided in the support and situated beneath the glass. The sheet 22 is slightly larger than the sheet 21 so that the borders of the sheets coincide fully after bending to the final shape. The represented part of the skirt 17 may be movable vertically relative to the form 16. In this manner, when the skirt/top form assembly meets the sheets and the support, it is the skirt 17 that first comes into contact with the support 20, said skirt then stopping its descent, but the top form continues to descend a little (usually 1 mm to 2 cm) to meet the top sheet 21. This procedure provides the method with flexibility. In order to reduce the necessary flows in the skirt, the distance (d) between the skirt and the top form should be as small as possible. For example, this distance may be from 5 mm to 40 mm, for example approximately 20 mm. The rims 23 and 24 of the sheets are situated between the skirt and the top form.

What is claimed is:

1. A method of bending two superposed sheets of glass brought to a bending temperature thereof with a device including:
    a bending cell in a bending zone, the bending cell being heated at the bending temperature,
    one or more convex top forms in the bending cell, the one or more convex top forms including means for generating a suction creating an upward airflow blowing over a rim of the sheets, the suction being sufficient to lift and hold the sheets against the one or more convex top forms,
    a bottom solid concave mold in the bending cell, the bottom solid concave mold including openings on a main face thereof and being movable in the bending cell, and
    a train of supports moving toward the bending zone, each support passing sequentially beneath the one or more convex top forms,
    the method comprising:
    conveying the sheets toward the bending zone by each support of the train;
    lowering a first convex top form of the one or more convex top forms toward a support of the train of supports;
    picking up the sheets from the support via the suction which creates the upward airflow blowing over the rim of the sheets;
    then raising the first convex top form again such that the bottom solid concave mold is able to move from a rest position to a position beneath the first convex top form;
    then forming the sheets by lowering the first convex top form again to bend the sheets by then pressing on the sheets against a full surface of the bottom solid concave form;
    then picking up the bent sheets with a convex top form of the one or more convex top forms via the suction such that the bent sheets are secured;
    raising the convex top form of the one or more convex top forms; and
    returning the bottom solid concave mold to the rest position;
    then lowering the convex top form of the one or more convex top forms that picked up the bent sheets such that the bent sheets are secured;
    delivering the bent sheets to the support of the train of supports; and
    then taking the bent sheets to a cooling zone via the support of the train of supports.

2. The method as claimed in claim 1, further comprising moving the bottom solid concave form horizontally in the bending cell from the rest position to a position beneath the first convex top form.

3. The method as claimed in claim 1, further comprising moving the bottom solid concave form in the bending cell by horizontal translation when the bottom solid concave form is returning to the rest position.

4. The method as claimed in claim 1, further comprising pre-bending the sheets during when the sheets are moving toward the bending zone.

5. The method as claimed in claim 1, further comprising separating the sheets from the bottom solid concave form after the sheets are bent, by being picked up with aid of a second convex top form of the one or more convex top forms, the second convex top form generating the suction creating the upward airflow blowing over the rim of the sheets so as to lift and hold the sheets against the second convex top form; and
    letting the sheets, via the second convex top form, rest on a support of the train of supports that takes the bent sheets toward the cooling zone for cooling.

6. The method as claimed in claim 5, wherein the second top convex form separating the sheets from the bottom solid concave form is distinct from the first top convex form, the sheets being moved from a position beneath the first top convex form to a position beneath the second top convex form by movement of the bottom solid concave form supporting the sheets.

7. The method as claimed in claim 5, wherein, during the step of letting the sheets rest on a support that takes the bent sheets to the cooling zone for cooling, an additional set of sheets has already begun being bent, the bottom solid concave form being placed beneath the first convex top form.

8. The method as claimed in claim 5, wherein the second convex top form is a frame.

9. The method as claimed in claim 1, wherein, for cooling, the two sheets are placed on the support that takes the sheets to the cooling zone, the support being the same support that brought the sheets under the first convex top form prior to the picking step of picking up the sheets before the sheets are bent.

10. The method as claimed in claim 1, wherein the first convex top form is a frame.

11. The method as claimed in claim 1, wherein the forming of the sheets by pressing them against the bottom solid concave form is performed via suction generated through openings of the bottom solid concave form.

12. A method of bending two superposed sheets of glass brought to a bending temperature thereof with a device including:
    a bending cell in a bending zone, the bending cell being heated at the bending temperature,
    one or more convex top forms in the bending cell, the one or more convex top forms including means for generating a suction creating an upward airflow blowing over a rim of the sheets, the suction being sufficient to lift and hold the sheets against the one or more convex top forms,
    a bottom solid concave mold in the bending cell, the bottom solid concave mold including openings on a main face thereof and being movable in the bending cell, and
    a train of supports moving toward the bending zone, each support passing sequentially beneath the one or more convex top forms,
    the method comprising:
    conveying the sheets toward the bending zone by each support of the train;
    lowering a first convex top form of the one or more convex top forms toward a support of the train of supports;
    picking up the sheets from the support via the suction which creates the upward airflow blowing over the rim of the sheets;
    then raising the first convex top form again such that the bottom solid concave mold is able to move from a rest position to a position beneath the first convex top form;
    then forming the sheets by lowering the first convex top form again by pressing on the sheets so as to flatten them against a full surface of the bottom solid concave form;

then picking up the sheets with a convex top form of the one or more convex top forms via the suction such that the sheets are secured;

raising the convex top form of the one or more convex top forms;

returning the bottom solid concave mold to the rest position in the bending cell by horizontal translation;

then lowering the convex top form of the one or more convex top forms that picked up the sheets such that the sheets are secured;

delivering the sheets to the support of the train of supports; and then taking the sheets to a cooling zone via the support of the train of supports.

13. The method as claimed in claim 12, further comprising separating the sheets from the bottom solid concave form after the sheets are bent, by being picked up with aid of a second convex top form of the one or more convex top forms, the second convex top form being different from the first convex top form, and the second convex top form generating the suction creating the upward airflow blowing over the rim of the sheets so as to lift and hold the sheets against the second convex top form; and letting the sheets, via the second convex top form, rest on a support of the train of supports that takes the bent sheets toward the cooling zone for cooling.

14. The method as claimed in claim 13, wherein the second convex top form is a frame.

15. The method as claimed in claim 12, wherein, for cooling, the two sheets are placed on the support that takes the sheets to the cooling zone, the support being the same support that brought the sheets under the first convex top form prior to the picking step of picking up the sheets before the sheets are formed.

16. The method as claimed in claim 12, wherein the first convex top form is a frame.

17. The method as claimed in claim 12, wherein the forming of the sheets by pressing them against the bottom solid concave form is performed via suction generated through openings of the bottom solid concave form.

\* \* \* \* \*